United States Patent Office 3,794,653
Patented Feb. 26, 1974

3,794,653
SUBSTITUTED N-BENZYLIMIDAZOLES
Wilfried Draber, Wuppertal-Elberfeld, Erik Regel, Wuppertal-Cronenberg, and Karl-Heinz Büchel and Manfred Plempel, Wuppertal-Elberfeld, Germany, assignors to Bayer Aktiengesellschaft, Leverkusen, Germany
No Drawing. Original application Mar. 4, 1970, Ser. No. 16,219, now Patent No. 3,709,901. Divided and this application Jan. 5, 1972, Ser. No. 215,676
Claims priority, application Germany, Mar. 7, 1969, P 19 11 646.2
Int. Cl. C07d 31/46, 31/50
U.S. Cl. 260—296 R                    18 Claims

ABSTRACT OF THE DISCLOSURE

Substituted N-benzylimidazoles of the formula:

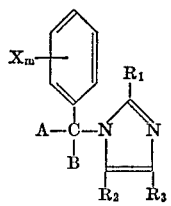

wherein $R_1$, $R_2$ and $R_3$ are each hydrogen, straight or branched chain lower alkyl or straight or branched chain lower alkenyl,
X is hydrogen, lower alkyl, lower alkoxy, lower alkylmercapto, lower alkenylmercapto, trifluoromethyl, halogen, nitro, cyano, amino or amino substituted by 1 or 2 aliphatic moieties,
m is 1 or 2,
A is phenyl; substituted phenyl, pyridyl, lower alkyl or cycloalkyl,
B is a 5-membered heteroaromatic ring of the formula:

wherein

D is CH or N,
E is oxygen, sulphur, N-lower alkyl or N-aryl,
Y is hydrogen, 1 or 2 lower alkyls, 1 or 2 halogens, aryl or substituted aryl, and
n is 1 or 2, are produced by reacting a compound of the formula:

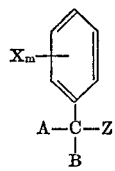

wherein A, B, X and m are as above defined and Z is chlorine or bromine, with at least the theoretically necessary amount of imidazole, optionally in the presence of an acid acceptor, in a polar organic solvent, at a temperature of from 20° C. to 150° C. These substituted N-benzylimidazoles are useful as antimycotics and are effective against both yeasts and dermatophytes. These compounds are effective against a wide range of fungi pathogenic to humans and animals.

This is a division of application Ser. No. 16,219 filed Mar. 4, 1970, now U.S. Pat. No. 3,709,901.

The present invention is concerned with substituted N-benzylimidazoles. More particularly, the present invention is concerned with heterocyclic-substituted N-benzylimidazoles in which the methylene group is substituted by a five-membered heterocycle.

The compounds of the present invention may be represented by the formula:

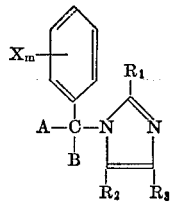

wherein $R_1$, $R_2$ and $R_3$ are each hydrogen, straight or branched chain lower alkyl or straight or branched chain lower alkenyl,
X is hydrogen, lower alkyl, lower alkoxy, lower alkylmercapto, trifluoromethyl, halogen, nitro, cyano, amino or substituted amino,
m is 1 or 2,
A is phenyl, substituted phenyl, pyridyl, alkyl (preferably lower alkyl) or cycloalkyl, and
B is a 5-membered heterocyclic ring of the formula:

     (2)

wherein

D is CH or nitrogen,
E is oxygen, sulphur, N-alkyl or N-aryl,
Y is hydrogen, 1 or 2 lower alkyls, 1 or 2 halogens, aryl or substituted aryl, and
n is 1 or 2, or a pharmaceutically acceptable non-toxic salt thereof.

Preferably, $R_1$, $R_2$ and $R_3$ are hydrogen, alkyl of 1 to 4 carbon atoms which may be straight or branched chain or alkenyl of 2 to 4 carbon atoms which may be straight or branched chain; X is hydrogen, trifluoromethyl, halogen, nitro, cyano, lower alkyl, lower alkoxy, lower alkylmercapto of 1 to 4 carbon atoms in the alkyl moiety which alkyl moiety may be straight or branched chain, lower alkenylmercapto of 2 to 4 carbon atoms in the alkenyl moiety which alkenyl moiety may be straight or branched chain, amino or amino substituted by 1 or 2 aliphatic moieties; A is phenyl; phenyl substituted by hydrogen, trifluoromethyl, halogen, nitro, cyano, lower alkyl, lower alkoxy, lower alkylmercapto of 1 to 4 carbon atoms in the alkyl moiety which alkyl moiety may be straight or branched chain, lower alkenylmercapto of 2 to 4 carbon atoms in the alkenyl moiety which alkenyl moiety may be straight or branched chain, amino or amino substituted by 1 or 2 aliphatic moieties; alkyl of 1 to 4 carbon atoms; cycloalkyl of 4, 5 or 6 carbon atoms or pyridyl linked in the 2-, 3- or 4-position to the central carbon atom; E is oxygen, sulphur, N-alkyl of 1 to 4 carbon atoms, N-phenyl or N-phenyl substituted by hydrogen, trifluoromethyl, halogen, nitro, cyano, lower alkyl, lower alkoxy, lower alkylmercapto of 1 to 4 carbon atoms in the alkyl moiety which alkyl moiety may be straight or branched chain, lower alkenylmercapto of 2 to 4 carbon atoms in the alkenyl moiety which alkenyl moiety may be straight or branched chain, amino or amino substituted by 1 or 2 aliphatic moieties; and Y is hydrogen, alkyl of 1 to 4 carbon atoms, halogen, phenyl or phenyl substituted by hydrogen, trifluoromethyl, halogen, nitro, cyano, lower alkyl, lower alkoxy, lower alkylmercapto of 1 to 4 carbon atoms in the alkyl moiety which alkyl moiety may be straight or branched chain, lower alkenylmercapto of 2 to 4 carbon atoms in the alkenyl moiety which alkenyl moiety may be straight or branched chain, amino or amino substituted by 1 or 2 aliphatic moieties.

Compounds of the Formula 1 wherein $R_1$, $R_2$ and $R_3$ are each hydrogen, A is phenyl or pyridyl, X is hydrogen or o-, m- or p-chloro or o-, m- or p-fluoro, m is 1 and B is optionally substituted thienyl, isoxazolyl, isothiazolyl, imidazolyl, furyl or thiazolyl are a particularly preferred embodiment of the present invention.

Examples of alykl moieties for A are methyl, ethyl, and tert.-butyl. Examples of cycloalkyl moieties for A are cyclopropyl, cyclopentyl and cyclohexyl.

Examples of heterocyclic moieties B are:

| | | |
|---|---|---|
| (3) | | 2-thienyl. |
| (4) | | 2-furyl. |
| (5) | | 5-(3-methyl)-isoxazolyl. |
| (6) | | 3-(5-methyl)-isoxazolyl. |
| (7) | | 5-(3,4-dichloro)-isothiazolyl. |
| (8) | | 5-(2,4-dimethyl)-thiazolyl. |
| (9) | | 2-(4-methyl)-thiazolyl. |
| (10) | | 2-(1-methyl)-imidazolyl. |
| (11) | | 2-(1-phenyl)-imidazolyl. |
| (12) | | 3-(4-methyl)-1,2,4-triazolyl. |

Among the pharmaceutically acceptable non-toxic salts which are part of the present invention are salts obtained from acids such as hydrohalic acids, phosphoric acids, sulphonic acids, mono- and dicarboxylic acids and hydroxycarboxylic acids. Examples of organic acids are acetic acid, tartaric acid, lactic acid, malic acid, citric acid, salicylic acid, sorbic acid and ascorbic acid.

The compounds of the Formula I are produced by reacting a compound of the formula:

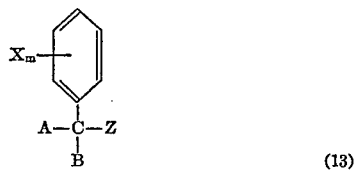

wherein A, B, X and m are as above defined and Z is chlorine or bromine, optionally in the presence of an acid acceptor, with at least the theoretically necessary amount of imidazole in a polar organic solvent, at a temperature of from about 20° C. to 150° C.

The compounds of Formula 13 can be prepared in various ways. For example, a carbinol (Formula 13 wherein Z is hydroxyl) can be used as the starting material and reacted with a halogenating agent such as thionyl chloride, thionyl bromide, phosphoryl chloride, phosphoryl bromide, acetyl chloride or acetyl bromide, in solvents such as for example ether, methylene chloride, benzene or toluene. It may sometimes be expedient to carry out the halogenation in a polar solvent and to let the reaction with the imidazole follow immediately without intermediate isolation of the halide formed. Suitable polar organic solvents include acetonitrile, nitromethane, dimethyl formamide and hexamethyl-phosphoric acid triamide.

Another process for the production of compounds of the Formula 13 in which Z is chlorine comprises reacting a ketone of the formula:

with PCl₅ to form a dichloride of the formula:

which is then reacted in the presence of at least an equivalent of aluminum chloride with an optionally substituted benzene of the formula:

to form the chloride of the Formula 13.

In this Friedel-Crafts reaction, an excess of the benzene itself or carbon disulphide may be used as solvent.

Table 1 sets forth compounds representative of those of the Formula 1 and the table of reactants following indicate the starting materials. In all cases in Table 1, $R_1$, $R_2$ and $R_3$ are each hydrogen and m is 1.

TABLE 1

| Compound | A | B | X | M.P., °C. |
|---|---|---|---|---|
| 1 | Phenyl | 2-thienyl | H | 182 |
| 2 | do | do | 4-F | 144-145 |
| 3 | do | 3-(5-methyl)-isoxazolyl | H | 149-150 |
| 4 | do | do | 3-Cl | [1] 107-110 |
| 5 | do | do | 4-F | 134-136 |
| 6 | do | do | 4-Cl | 166-167 |
| 7 | do | do | 3-CF₃ | 69 |
| 8 | do | 5-(3-methyl)-isoxazolyl | H | 171 |
| 9 | do | do | 4-Cl | 136-137 |
| 10 | do | do | 4-F | 140-142 |
| 11 | do | do | 2-Cl | 144 |
| 12 | do | 5-(3,4-dichloro)-isothiazolyl | H | [1] 157 |
| 13 | do | do | 4-F | 95 |
| 14 | do | 2-(1-methyl)-imidazolyl | H | 200 |
| 15 | 3-pyridyl | 5-(3-methyl)-isoxazolyl | H | 114-116 |
| 16 | Phenyl | 2-(1-methyl)-imidazolyl | 2-F | 230 |
| 17 | do | do | 2-Cl | 162 |
| 18 | do | do | 3-Cl | 150 |
| 19 | do | do | 4-Cl | 134 |
| 20 | do | 2-(1-phenyl)-imidazolyl | H | 125 |
| 21 | do | 3-(5-methyl)-isoxazolyl | 4-SCH₃ | 109-111 |
| 22 | do | 5-(3-methyl)-isoxazolyl | 3-Cl | 91-94 |
| 23 | do | do | 4-SCH₃ | 119-121 |
| 24 | do | 5-(3,4-dichloro)-isothiazolyl | 4-Cl | 95 |
| 25 | do | do | 3-CF₃ | 85-90 |
| 26 | do | 5-(2,4-dimethyl)-thiazolyl | H | 145-147 |
| 27 | do | 5-(2,3-dimethyl)-pyrazolyl | H | 146-148 |
| 28 | do | do | 3-Cl | 59-61 |
| 29 | do | 2-(1-phenyl)-imidazolyl | 4-Cl | 80 |
| 30 | do | 3-(5-methyl)-isoxazolyl | 4-CH₃ | 111 |
| 31 | do | do | 3-CH₃ | [2] Oil |
| 32 | do | 5-(3-methyl)-isoxazolyl | 4-CH₃ | 119 |
| 33 | do | do | 3-CH₃ | [3] Oil |
| 34 | do | 5-(2,4-dimethyl)-thiazolyl | 3-CF₃ | [4] Oil |
| 35 | do | do | 4-F | 150 |
| 36 | do | 5-(2,3-dimethyl)-pyrazolyl | 4-SCH₃ | 161 |
| 37 | do | do | 4-F | 129 |
| 38 | do | do | 2-Cl | 140 |
| 39 | do | do | 4-Cl | 128 |

[1] + 1 HCl+1 H₂O.  [2] $n_D^{40°}=1.5766$.  [3] $n_D^{40°}=1.5881$.  [4] $n_D^{40°}=1.5681$.

TABLE OF REACTANTS

| | | | |
|---|---|---|---|
| 1 | Diphenyl-2-thienyl-carbinol | Halogenating agent. | Imidazole. |
| 2 | Phenyl-4-fluorophenyl-2-thienyl-carbinol. | ....do.......... | Do. |
| 3 | Diphenyl-3-(5-methyl)-isoxazolyl-carbinol. | ....do.......... | Do. |
| 4 | Phenyl-3-chlorophenyl-3-(5-methyl)-isoxazolyl-carbinol. | ....do.......... | Do. |
| 5 | Phenyl-4-fluorophenyl-3-(5-methyl)-isoxaxolyl-carbinol. | ....do.......... | Do. |
| 6 | Phenyl-4-chlorophenyl-3-(5-methyl)-isoxazolyl-carbinol. | ....do.......... | Do. |
| 7 | Phenyl-3-trifluoromethylphenyl-3-(5-methyl)-isoxazolyl-carbinol. | ....do.......... | Do. |
| 8 | Diphenyl-5-(3-methyl)-isoxazolyl-carbinol. | ....do.......... | Do. |
| 9 | Phenyl-4-chlorophenyl-5-(3-methyl)-isoxazolyl-carbinol. | ....do.......... | Do. |
| 10 | Phenyl-4-fluorophenyl-5-(3-methyl)-isoxazolyl-carbinol. | ....do.......... | Do. |
| 11 | Phenyl-2-chlorophenyl-5-(3-methyl)-isoxazolyl-carbinol. | ....do.......... | Do. |
| 12 | Diphenyl-5-(3,4-dichloro)-isothiazolyl-chloromethane hydrochloride. | | Do. |
| 13 | Phenyl-4-fluorophenyl-5-(3,4-dichloro)-isothiazolyl-chloromethane hydrochloride. | | Do. |
| 14 | Diphenyl-2-(1-methyl)-imidazolyl-chloromethane hydrochloride. | | Do. |
| 15 | Phenyl-3-pyridyl-5-(3-methyl)-isoxazolyl-carbinol. | Halogenating agent. | Do. |
| 16 | Phenyl-2-fluorophenyl-2-(1-methyl)-imidazolyl-chloromethane hydrochloride. | | Do. |
| 17 | Phenyl-2-chlorophenyl-2-(1-methyl)-imidazolyl-chloromethane hydrochloride. | | Do. |
| 18 | Phenyl-3-chlorophenyl-2-(1-methyl)-imidazolyl-chloromethane hydrochloride. | | Do. |
| 19 | Phenyl-4-chlorophenyl-2-(1-methyl)-imidazolyl-chloromethane hydrochloride. | | Do. |
| 20 | Diphenyl-2-(1-phenyl)imidazolyl-chloromethane hydrochloride. | | Do. |
| 21 | Phenyl-4-thiomethylphenyl-3-(5-methyl)-isoxazolyl-carbinol. | Halogenating agent. | Do. |
| 22 | Phenyl-3-chlorophenyl-5-(3-methyl)-isoxazolyl-carbinol. | ....do.......... | Do. |
| 23 | Phenyl-4-thiomethylphenyl-5-(3-methyl)-isoxazolyl-carbinol. | ....do.......... | Do. |
| 24 | Phenyl-4-chlorophenyl-5-(3,4-dichloro)-isothiazolyl-chloromethane hydrochloride. | | Do. |
| 25 | Phenyl-3-trifluoromethylphenyl-5-(3,4-dichloro)-isothiazoly-chloromethane hydrochloride. | | Do. |
| 26 | Diphenyl-5-(1,4-dimethyl)-thiazolyl-chloromethane hydrochloride. | | Do. |
| 27 | Diphenyl-5-(2,3-dimethyl)-pyrazolyl-chloromethane hydrochloride. | | Do. |
| 28 | Phenyl-3-chlorophenyl-5-(2,3-dimethyl)-pyrazolyl-chloromethane hydrochloride. | | Do. |
| 29 | Phenyl-4-chlorophenyl-2-(1-phenyl)-imidazolyl-chloromethane hydrochloride. | | Do. |
| 30 | Phenyl-(4-benzyl)-3-(5-methyl)-isoxazolyl-carbinol. | Halogenating agent. | Do. |
| 31 | Phenyl-(3-benzyl)-3-(5-methyl)-isoxazolyl-carbinol. | ....do.......... | Do. |
| 32 | Phenyl-(4-benzyl)-5-(3-methyl)-isoxazolyl-carbinol. | ....do.......... | Do. |
| 33 | Phenyl-(3-benzyl)-5-(3-methyl)-isoxazolyl-carbinol. | ....do.......... | Do. |
| 34 | Phenyl-3-trifluoromethylphenyl-5-(1,4-dimethyl)-thiazolyl-chloromethane hydrochloride. | | Do. |
| 35 | Phenyl-4-fluorophenyl-5-(1,4-dimethyl)-thiazolyl-chloromethane hydrochloride. | | Do. |
| 36 | Phenyl-4-thiomethylphenyl-5-(2,3-dimethyl)-pyrazolyl-chloromethane hydrochloride. | | Do. |
| 37 | Phenyl-4-fluorophenyl-5-(2,3-dimethyl)-pyrazolyl-chloromethane hydrochloride. | | Do. |
| 38 | Phenyl-2-chlorophenyl-5-(2,3-dimethyl)-pyrazolyl-chloromethane hydrochloride. | | Do. |
| 39 | Phenyl-4-chlorophenyl-5-(2,3-dimethyl)-pyrazolyl-chloromethane hydrochloride. | | Do. |

The following non-limitative examples illustrate the production of representative compounds. The remaining listed compounds and other compounds according to the present invention may be produced by processes analogous thereto.

EXAMPLE I

Diphenyl-2-thienyl-1-imidazolyl-methane
(Compound 1 in Table 1)

26.6 g. (0.1 mol) diphenyl-thienyl-carbinol were dissolved in 150 ml. of anhydrous methylene chloride and 13 g. thionyl chloride were slowly added at 0° C. After standing for 3 hours, the mixture was concentrated in a vacuum, the residue (dark oil) was taken up with acetonitrile and added dropwise at 80° C. to a solution of 20 g. (0.3 mol) imidazole in 200 ml. acetonitrile. After boiling for one hour, the mixture was diluted with ice-water, the precipitate was filtered off with suction, taken up with ether, filtered through charcoal, dried, and concentrated. After washing with ether/pentane, there were obtained 15.7 g. (50%) of pale brown crystals; M.P. 178 to 179° C. (decomposition).

Recrystallization from cyclohexane/benzene gave the compound of the formula:

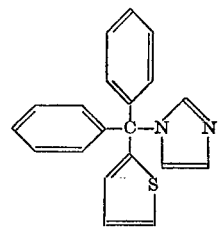

(17)

of M.P. 182° C. (decomposition)

EXAMPLE II

Diphenyl-3-(5-methyl)-isoxazolyl-2-imidazolyl-methane
(Compound 3 in Table 1)

26.5 g. (0.1 mol) diphenyl-3-(5-methyl)-isoxazolyl-carbinol (M.P. 97° C.) were dissolved in 150 ml. methylene chloride, and 10 ml. thionyl chloride were added. The solution was allowed to stand overnight, briefly heated to boiling point, and concentrated. A dark brown oil was obtained the solution of which in 100 ml. acetonitrile was added dropwise to a boiling solution of 20 g. imidazole in 100 ml. acetonitrile and boiled for 3 hours. The mixture was subsequently poured into ice/water, the precipitate filtered off with suction and washed with water. 29 g. (86%) of a grey powder of M.P. 145 to 147° C. were obtained. After recrystallization from ethyl acetate, the compound of the formula:

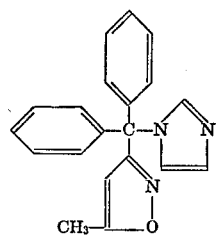

(18)

was obtained in the form of white crystals of M.P. 149–150° C.

EXAMPLE III

Diphenyl-5-(3,4-dichloro)-isothiazolyl-2-imidazolyl-methane (Compound 12 in Table 1)

39.1 g. (0.1 mol) diphenyl-5-(3,4-dichloro)-isothiazolyl-chloromethane hydrochloride (M.P. 96° C.) were dissolved in 150 ml. of hot acetonitrile and the solution was added dropwise to a boiling solution of 20 g. imidazole in 100 ml. acetonitrile. The mixture was boiled for 15 minutes, poured onto about 250 g. of ice, and 50 ml. of concentrated hydrochloric acid were added. The hydrochloride hydrate was precipitated in the form of pale brown leaflets. These were filtered off with suction and recrystallized from dilute hydrochloric acid. Yield: 20.5 g. (53%) of the compound of the formula:

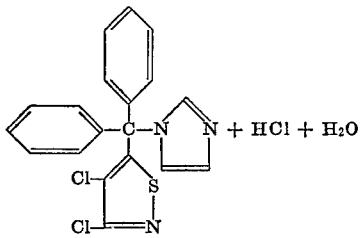

of M.P. 157° C. (decomposition).

EXAMPLE IV

Diphenyl-2-(1-methyl)-imidazolyl-1-imidazolyl-methane (Compound 14 in Table 1)

31.9 g. (0.1 mol) diphenyl - 2 - (1-methyl)-imidazolyl-chloromethane hydrochloride (M.P. 150° C.) were dissolved in 300 ml. acetonitrile, the solution was added to a solution of 6.8 g. (0.1 mol) imidazole and 20.2 g. (0.2 mol) triethylamine in 100 ml. acetonitrile, and heated at 80° C. for 4 hours. The solvent was subsequently removed, the residue was taken up with benzene and washed with water. After drying, concentration and recrystallization from acetonitrile, there result 22 g. (70%) of colorless crystals of the compound of the formula:

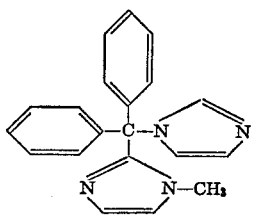

with M.P. 200° C.

The diphenyl-2-(1-methyl)-imidazolyl - chloromethane hydrochloride used as starting material was obtained by mixing a solution of 46.4 g. (0.1 mol) diphenyl-2-(1-methyl)-imidazolyl-carbinol (M.P. 193° C.) in 500 mlg. methylene chloride with 24.0 g. (0.2 mol) thionyl chloride, followed by boiling for 15 hours. After evaporation of the solvent, there remains the crystalline hydrochoride of M.P. 150° C.

In contrast to known antimycotics which are generally effective only against either yeast such as Amphotericin B, or against nematodes, for example, Griseofulvin, the compounds of the present invention are effective against both nematodes and yeasts. This was particularly surprising because the compounds of the present invention may be administered orally and this is particularly useful for the treatment of warm-blooded animals. When administered orally, the compounds of the present invention may be formed into tablets, capsules and the like or they may be administered in the form of aqueous emulsions, suspensions or solutions. The compounds may be administered as such or in the form of their pharmaceutically acceptable non-toxic salts.

THERAPEUTIC ACTIVITY (1) In vitro effect against human-pathogenic fungi

The compounds of the present invention exhibit a broad spectrum of good activity against fungi pathogenic both to humans and animals. The minimal inhibitory concentrations (MIC) for representative species of fungi are set forth in Table 2. The MIC was tested in Sabouraud's milieu d'épreuve or in glucose/meat/broth. The incubation temperature was 28° C., the incubation period 48 to 96 hours.

In Table 2 Compounds 1–14 which are considered to be representative of the compounds of the present invention were tested and these numbers correspond to the compounds set forth in Table 1.

TABLE 2

[MIC in γ/ml. test medium]

| Compound | Trichophyton ment. | | Cand. alb. | | Pen. comune | Asp. niger | | Microsporum felin |
|---|---|---|---|---|---|---|---|---|
| | Without serum | With serum | Without serum | With serum | | Without serum | With serum | |
| 1 | 10 | 10 | 10 | 40 | 100 | | | |
| 2 | 10 | 10 | 4 | >100 | 40 | | | |
| 3 | <4 | <4 | 4 | 20 | <4 | 10 | 20 | <4 |
| 4 | <4 | <4 | 4 | 40 | <4 | <4 | 20 | <4 |
| 5 | <4 | <4 | 10 | 20 | <4 | 4 | 20 | <4 |
| 6 | <4 | <4 | 4 | 4 | <4 | 4 | 20 | <4 |
| 7 | <4 | 4 | 4 | 4 | <4 | 10 | 40 | <4 |
| 8 | <4 | <4 | 4 | 20 | <4 | 4 | >100 | 20 |
| 9 | <4 | <4 | 4 | 40 | <4 | 4 | 100 | 10 |
| 10 | <4 | <4 | 4 | 10 | <4 | 4 | 20 | 10 |
| 11 | <4 | <4 | 4 | 10 | 4 | <4 | 20 | <4 |
| 12 | <4 | 4 | 4 | 100 | <4 | <4 | 20 | <4 |
| 13 | <4 | 4 | 4 | 100 | 100 | 4 | 20 | <4 |
| 14 | 20 | 20 | >100 | >100 | 100 | 40 | 100 | 100 |

(2) Effect in vivo

In order to test the effect of the compounds of the present invention in vivo, Compounds 9, 10, 12 and 13 of Table 1 were selected as representative compounds and were used in treating white mice infected with Candida and Trichophyton.

When doses of 30 to 60 mg. of compound 12 per kg. body weight are applied once to twice per os, 16 to 20 animals survive the infection at the aforesaid dosage, whereas 0 to 2 untreated control animals survive for 6 days after infection.

In the case of trichophytia the development of the infection can be completely suppressed. The average blood level at the stated dosage amounts to 5 to 12 γ per ml., level maxima occur 4 to 6 hours after application. The acute toxicity of the preparations for several animal species lies between 500 and 800 mg./kg. per os.

The compounds of the present invention may be used for the following purposes:

(a) In human medicine:

(1) for the treatment of dermatomycoses, caused by fungi of the species Trichophytes, Microsporium, Epidermophytes, Aspergillus, *Candida albicans* and other yeasts, especially Coccidioides, Histoplasma and Blastomyces.

(2) Organomycoses caused by yeasts, mould fungi and Dermatophytes; and (b) In veterinary medicine:

Dermatomycoses and organomycoses caused by yeasts, mould fungi and Dermatophytes.

In addition to oral administration, parenteral administration of the compounds of the present invention is also possible. When the compounds are administered parenterally, they may be administered in the form of solutions, for example, dimethyl sulphoxide/glycerol/water 2:2:6, alcohol solutions, buffer solutions and the like. The compounds can also be administered in the form of powders, tablets, capsules, dragees and the like.

The average dosage for humans amounts to about 20 to about 75 mg./kg. body weight, preferably 30 to 50 mg./kg. body weight, at intervals of up to 8 hours, the therapy lasting, on average, for 14 to 20 days.

It may be necessary to deviate from the aforesaid quantities, depending upon the method of application, but also on account of the individual reaction to the medicament or on the type of formulation of the latter (soluble in the small intestine or gastric juice) and the moment in time or the interval at which the application takes place. For example, it may suffice in some cases to use less than the aforesaid minimum amount, whereas in other cases it may be necessary to go beyond the upper limit mentioned above. In the case where larger amounts are applied, it may be advisable to distribute these over the day in several individual doses.

The compounds of the present invention may be administered as such, or in combination with various inert carriers, such as tablets, capsules, powders, sprays, aqueous suspensions, injectable solutions, elixers, syrups and the like. Carriers of this type comprise solid extenders or fillers, a sterile aqueous medium as well as various non-toxic organic solvents and the like. Obviously, tablets and the like suitable for oral application can be provided with sweeteners or the like. In the aforesaid case, the therapeutically active compound should be present at a concentration of about 0.5 to 5 percent by weight of the total mixture, i.e. in amounts which are sufficient to achieve the dosage range mentioned above.

In the case of oral application, tablets may obviously contain additives such as sodium citrate, calcium carbonate and dicalcium phosphate, together with various additives such as starch, preferably potato starch, and the like, and binding agents, such as polyvinyl pyrrolidone, gelatin and the like. Furthermore, lubricants such as magnesium stearate, sodium lauryl sulphate and talc may be added to the tablets. In the case of aqueous suspensions and/or elixers which are intended for oral application, the active ingredient may be used together with various flavorings, dyestuffs, emulsifiers and/or together with diluents such as water, ethanol, propylene glycol, glycerol and similar compounds or combinations.

For parenteral application, solutions of the active ingredients in sesame or peanut oil or in aqueous propylene glycol or N,N-dimethyl formamide may be used, as can sterile aqueous solutions in the cases where the compounds are water-soluble. If required, such aqueous solutions should be buffered in the usual way, and the liquid diluent should previously be rendered isotonic by the addition of the necessary amount of salt or glucose. Such aqueous solutions are particularly suitable for intravenous, intramuscular and intraperitoneal injections.

The antimycotic compositions according to the present invention comprise at least one compound of the Formula 1 either as such or in the form of its salt in admixture with a pharmaceutically acceptable inert diluent or carrier. The diluent or carrier may be solid or liquid.

The invention further provides a medicament in dosage unit form comprising at least one of the new active compounds either alone or in admixture with a pharmaceutically acceptable solid or liquid diluent or carrier. The medicament may include a protective envelope containing the active compound and, if used, the diluent or carrier.

The term "medicament in dosage unit form" as used in the present specification means a medicament as defined above in the form of discrete portions each containing a unit dose, or a multiple or sub-multiple of a unit dose of the active compound or compounds. Such portions may, for example, be in monolithic coherent form, such as tablets, suppositories, pills or dragees; in wrapped or concealed form, such as wrapped powders, cachets, sachets or capsules; in ampoules, either free or as a sterile solution suitable for parenteral injection; or in any other form known to the art.

What is claimed is:

1. A compound of the formula:

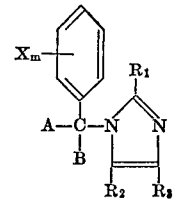

wherein
each of $R_1$, $R_2$ and $R_3$ is hydrogen, lower alkyl or lower alkenyl,
X is hydrogen, lower alkyl, lower alkoxy, lower alkylmercapto, lower alkenylmercapto, trifluoromethyl, halogen, nitro, cyano, or amino,
$m$ is 1 or 2,
A is pyridyl, lower alkyl, cycloalkyl of 4 to 6 carbon atoms, phenyl or phenyl substituted by trifluoromethyl, halogen, nitro, cyano, lower alkyl, lower alkoxy or lower alkylmercapto,
B is unsubstituted isoxazolyl or isoxazolyl substituted by one or two lower alkyl groups,
or a pharmaceutically acceptable non-toxic salt thereof.

2. The compound according to claim 1, wherein $R_1$, $R_2$ and $R_3$ are each hydrogen, $m$ is 1, X is hydrogen, A is phenyl and B is 3-(5-methyl)-isoxazolyl.

3. The compound according to claim 1, wherein $R_1$, $R_2$ and $R_3$ are each hydrogen, $m$ is 1, X is 3-chloro, A is phenyl and B is 3-(5-methyl)-isoxazolyl.

4. The compound according to claim 1, wherein $R_1$, $R_2$ and $R_3$ are each hydrogen, $m$ is 1, X is 4-fluoro, A is phenyl and B is 3-(5-methyl)-isoxazolyl.

5. The compound according to claim 1, wherein $R_1$, $R_2$ and $R_3$ are each hydrogen, $m$ is 1, X is 4-chloro A is phenyl and B is 3-(5-methyl)-isoxazolyl.

6. The compound according to claim 1, wherein $R_1$, $R_2$ and $R_3$ are each hydrogen, $m$ is 1, X is 3-trifluoromethyl, A is phenyl and B is 3-(5-methyl)-isoxazolyl.

7. The compound according to claim 1, wherein $R_1$, $R_2$ and $R_3$ are each hydrogen, $m$ is 1, X is hydrogen, A is phenyl and B is 5-(3-methyl)-isoxazolyl.

8. The compound according to claim 1, wherein $R_1$, $R_2$ and $R_3$ are each hydrogen, $m$ is 1, X is 4-chloro, A is phenyl and B is 5-(3-methyl)-isoxazolyl.

9. The compound according to claim 1, wherein $R_1$, $R_2$ and $R_3$ are each hydrogen, $m$ is 1, X is 4-fluoro, A is phenyl and B is 5-(3-methyl)-isoxazolyl.

10. The compound according to claim 1, wherein $R_1$, $R_2$ and $R_3$ are each hydrogen, $m$ is 1, X is 2-chloro, A is phenyl and B is 5-(3-methyl)-isoxazolyl.

11. The compound according to claim 1, wherein $R_1$, $R_2$ and $R_3$ are each hydrogen, $m$ is 1, X is hydrogen, A is 3-pyridyl and B is 5-(3-methyl)-isoxazolyl.

12. The compound according to claim 1, wherein $R_1$, $R_2$ and $R_3$ are each hydrogen, $m$ is 1, X is 4-thiomethyl, A is phenyl and B is 3-(5-methyl)-isoxazolyl.

13. The compound according to claim 1, wherein $R_1$, $R_2$ and $R_3$ are each hydrogen, $m$ is 1, X is 3-chloro, A is phenyl and B is 5-(3-methyl)-isoxazolyl.

14. The compound according to claim 1, wherein $R_1$, $R_2$ and $R_3$ are each hydrogen, $m$ is 1, X is 4-thiomethyl, A is phenyl and B is 5-(3-methyl)-isoxazolyl.

15. The compound according to claim 1, wherein $R_1$, $R_2$ and $R_3$ are each hydrogen, $m$ is 1, X is 4-methyl, A is phenyl and B is 3-(5-methyl)-isoxazolyl.

16. The compound according to claim 1, wherein $R_1$, $R_2$ and $R_3$ are each hydrogen, $m$ is 1, X is 3-methyl, A is phenyl and B is 3-(5-methyl)-isoxazolyl.

17. The compound according to claim 1, wherein $R_1$, $R_2$ and $R_3$ are each hydrogen, $m$ is 1, X is 4-methyl, A is phenyl and B is 5-(3-methyl)-isoxazolyl.

18. The compound according to claim 1, wherein $R_1$, $R_2$ and $R_3$ are each hydrogen, $m$ is 1, X is 3-methyl, A is phenyl and B is 5-(3-methyl)-isoxazolyl.

No references cited.

HENRY R. JILES, Primary Examiner

M. A. M. CROWDER, Assistant Examiner

U.S. Cl. X.R.

260—294.8 R, 307 R; 424—263, 272